United States Patent [19]

Numata et al.

[11] Patent Number: 4,760,126

[45] Date of Patent: Jul. 26, 1988

[54] FLUORINE-CONTAINING POLYAMIDE-ACID DERIVATIVE AND POLYIMIDE

[75] Inventors: Shunichi Numata; Koji Fujisaki; Noriyuki Kinjo, all of Hitachi, Japan

[73] Assignees: Hitachi, Ltd.; Hitachi Chemical Co. Ltd., both of Tokyo, Japan

[21] Appl. No.: 904,203

[22] Filed: Sep. 8, 1986

Related U.S. Application Data

[62] Division of Ser. No. 670,977, Nov. 13, 1984, abandoned.

[51] Int. Cl.$^4$ .............................................. C08G 73/10
[52] U.S. Cl. .................................... 528/353; 528/352
[58] Field of Search ............................... 528/352, 353

[56] References Cited

U.S. PATENT DOCUMENTS

| | | | |
|---|---|---|---|
| 3,899,517 | 8/1975 | Fletcher et al. | 528/208 |
| 3,959,350 | 5/1976 | Rogers | 528/353 |
| 4,111,906 | 9/1978 | Jones et al. | 528/353 |
| 4,196,277 | 4/1980 | Jones et al. | 528/208 |
| 4,477,648 | 10/1984 | Jones et al. | 528/185 |

FOREIGN PATENT DOCUMENTS 1770585  11/1971  Fed. Rep. of Germany ...... 528/353
1239272   7/1971  United Kingdom ............... 528/185

*Primary Examiner*—Harold D. Anderson
*Assistant Examiner*—Frederick Krass
*Attorney, Agent, or Firm*—Antonelli, Terry & Wands

[57] ABSTRACT

A polyimide or polyamic acid synthesized from a diamine, which may be fluorinated, and a dianhydride of the following formula:

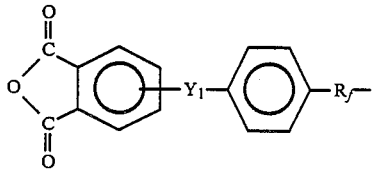

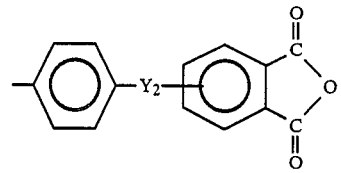

where $R_f$=perfluoroalkylene and $Y_1$ and $Y_2$ are independently oxy-carbonyl or thiocarbonyl.

16 Claims, No Drawings

FLUORINE-CONTAINING POLYAMIDE-ACID DERIVATIVE AND POLYIMIDE

CROSS REFERENCE TO RELATED APPLICATION

This is a division of application, Ser. No. 670,977, filed Nov. 13, 1984 which is now abandoned.

BACKGROUND OF THE INVENTION

This invention relates to a fluorine-containing polyamide-acid derivative and a polyimide produced therefrom excellent in moisture resistance and heat resistance and suitable for use as protective films for semiconductor devices, alpha particle barrier coatings for LSI (Large Scale Integration) and the like, interlayer insulators for multilevel interconnection in LSI and thin layer magnetic heads, aligning layers for liquid crystal display devices, flexible printed circuit boards, and the like.

It is well known that polyimide series polymers are useful as surface stabilizing films on exposed terminals of p,n-junctions, interlayer insulators for multilevel interconnection, alpha particle barriers for preventing soft errors of memory elements caused by natural radiation, and the like. But conventional polyimides have problems in that moisture absorption is large, adhesive properties are lowered due to moisture absorption, and the like. These problems appear practically as disconnection of wires due to corrosion of Al or Cu wiring materials in LSI, etc., blisters in insulating films at the time of rapid heating during soldering or bonding step, an increase in leakage current at p,n-junctions, and the like.

It is also found that low moisture absorption can be obtained when alkyl groups and dimethylsiloxane moieties are introduced into the polyimide skeleton, but there arises other problems such as remarkable lowering in heat resistance and solvent resistance.

As fluorine-containing polyimides, U.S. Pat. No. 4,203,922 discloses as their starting material

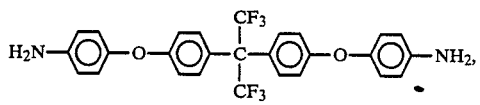

J. Polym. Sci., A-1, vol 10, 1789–1807 (1972) (by J. P. Critchley at al.) discloses a polyimide having repeating units of the formula:

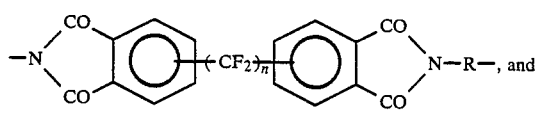

U.S. Pat. No. 3,959,350 discloses a polyimide having repeating units of the formula:

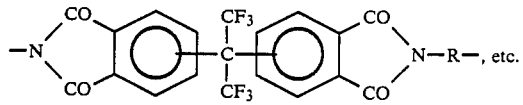

It is also known that similar polyimides have a repeating unit of the formula:

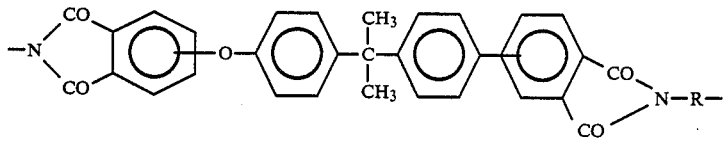

SUMMARY OF THE INVENTION

It is an object of this invention to provide a polyimide overcoming the defects of the prior art mentioned above and excellent in solvent resistance as well as low moisture absorption properties and thermal stability, useful as coating film material for semiconductors, and a precursor thereof, i.e., a polyamide-acid derivative.

This invention provides a polyamide-acid derivative having repeating units of the formula:

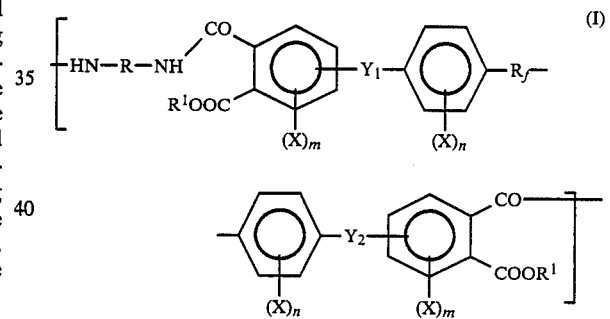

wherein $Y_1$ and $Y_2$ are independently a divalent group of —O—,

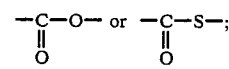

$R_f$ is a perfluoroalkylene group; each X is independently an alkyl group, a fluorinated alkyl group or a halogen atom; $R^1$ is a hydrogen atom or an alkyl group; R is a diamine residue obtained by removing two amino groups from a diamine; m is zero or an integer of 1 to 3; and n is zero or an integer of 1 to 4.

This invention also provides a polyimide having repeating units of the formula:

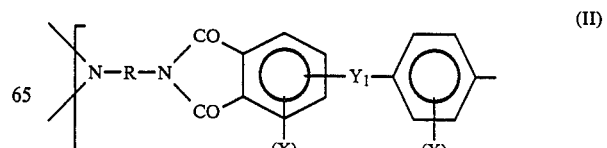

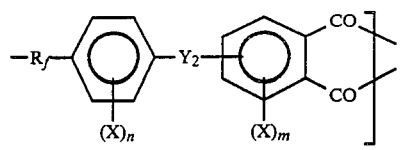

wherein R, X, Y$_1$, Y$_2$, R$_f$, m and n are as defined above.

DESCRIPTION OF THE PREFERRED EMBODIMENTS

The present inventors have synthesized various polyimides having different chemical structures and studied their properties to find that both low moisture absorption properties and heat resistance can be obtained by including tetracarboxylic acid derivatives having fluorinated alkyl groups.

The polyamide-acid derivative having repeating units of the formula (I), i.e., a precursor of polyimide, according to this invention is remarkably excellent in solubility in a solvent compared with conventional low moisture absorption polyamide-acids. That is, there is an advantage in that the polyamide-acid derivative can be dissolved in a polar solvent such as N-methyl-2-pyrrolidone (NMP), dimethylacetamide (DMAC), dimethyl sulfoxide (DMSO), dimethylformamide (DMF), sulfolane, etc., or a mixture of a polar solvent and a general-purpose solvent such as tetrahydrofuran, butyrolactone, cyclohexanone, acetone, methyl ethyl ketone, diacetone alcohol, etc., or in some cases, only in the general-purpose solvent.

But the good solubility becomes a defect after imidization and sometimes loses solvent resistance. In such a case, the following methods are effective:

(i) Introduction of pyrrolone rings

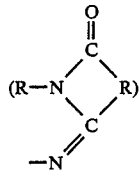

and/or isoindoloquinazolinedione rings

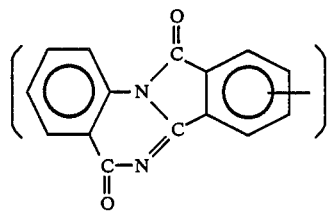

by modification with a compound of the formula:

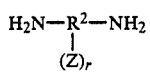 (III)

wherein R$^2$ is an aromatic group having a valence of 2+r; Z is a group selected from the group consisting of —NH$_2$, —CONH$_2$ and —SO$_2$NH$_2$ and is positioned at an ortho position for an amino group; r is an integer of 1 or 2. This modification is more preferable.

(ii) Final formation of crosslinked structure by modification with an amine having a polymerizable unsaturated carbon-carbon bond, a diamine, a dicarboxylic acid, a tricarboxylic acid, a tetracarboxylic acid or a derivative of these compounds. Examples of the unsaturated compounds are maleic acid, nadic acid, tetrahydrophthalic anhydride, ethynyl aniline, etc.

(iii) Final formation of crosslinked structure by modification with an aromatic amine having a phenolic hydroxyl group or a carboxyl group.

The above-mentioned modified polyamide-acids are also included in the polyamide-acid of this invention. Therefore, polyimides obtained from these modified polyamide-acids are also included in the polyimide of this invention.

In the above-mentioned formulae (I) and (II), R$_f$=

and at least one X is —CF$_3$ are more preferable.

In order to form the fundamental skeleton of the compound of this invention, it is easy to react a corresponding diamine and a tetracarboxylic acid derivative.

As the tetracarboxylic acid derivative, there can be used the following compounds, which are described in the form of free acids, but needless to say, acid dianhydrides, acid halides and acid esters of these acids are also usable in this invention.

Examples of tetracarboxylic acids for producing ester types of Y$_1$ and Y$_2$ in the formula (I) are as follows:

2,2-bis[4-(3,4-dicarboxybenzoyloxy)phenyl]hexafluoropropane,
2,2-bis[4-(2,3-dicarboxybenzoyloxy)phenyl]hexafluoropropane,
2,2-bis[4-(3,4-dicarboxybenzoyloxy)-3-bromophenyl]hexafluoropropane,
2,2-bis[4-(3,4-dicarboxybenzoyloxy-3,5-dibromophenyl]hexafluoropropane,
2,2-bis[4-(3,4-dicarboxybenzoyloxy)-3,5-dimethylphenyl]hexafluoropropane,
2,2-bis[4-(3,4-dicarboxybenzoyloxy)-3,5-bis(trifluoromethyl)phenyl]hexafluoropropane,
2,2-bis[4-(3,4-dicarboxybenzoyloxy)phenyl]octafluorobutane,
2,2-bis[4-(2-trifluoromethyl-3,4-dicarboxybenzoyloxy)phenyl]hexafluoropropane,
1,3-bis[4-(3,4-dicarboxybenzoyloxy)phenyl]hexafluoropropane,
1,5-bis[4-(3,4-dicarboxybenzoyloxy)phenyl]decafluoropentane,
1,6-bis[4-(3,4-dicarboxybenzoyloxy)phenyl]dodecafluorohexane,
1,7-bis[4-(3,4-dicarboxybenzoyloxy)phenyl]tetradecafluoroheptane,
1,5-bis[4-(3,4-dicarboxybenzoyloxy)-3,5-dibromophenyl]decafluoropentane,
1,5-bis[4-(3,4-dicarboxybenzoyloxy)-3,5-bistrifluoromethylphenyl]decafluoropentane,
1,5-bis[4-(2-trifluoromethyl-3,5-dicarboxybenzoyloxy)phenyl]decafluoropentane, etc.

Examples of tetracarboxylic acids for producing ether (—O—) types of Y$_1$ and Y$_2$ in the formula (I) are as follows:

2,2-bis[4-(3,4-dicarboxyphenoxy)phenyl]hexafluoropropane,
2,2-bis[4-(2,3-dicarboxyphenoxy)phenyl]hexafluoropropane,
2,2-bis[4-(3,4-dicarboxyphenoxy)-3-bromophenyl]hexafluoropropane,
2,2-bis[4-(3,4-dicarboxyphenoxy)-3,5-dibromophenyl]hexafluoropropane,
2,2-bis[4-(3,4-dicarboxyphenoxy)-3,5-dimethylphenyl]hexafluoropropane,
2,2-bis[4-(3,4-dicarboxyphenoxy)-3,5-bistrifluoromethylphenyl]hexafluoropropane,
2,2-bis[4-(3,4-dicarboxyphenoxy)phenyl]octafluorobutane,
2,2-bis[4-(3,4-dicarboxy-2-trifluoromethylphenoxy)phenyl]hexafluoropropane,
1,3-bis[4-(3,4-dicarboxyphenoxy)phenyl]hexafluoropropane,
1,5-bis[4-(3,4-dicarboxyphenoxy)phenyl]decafluoropentane,
1,6-bis[4-(3,4-dicarboxyphenoxy)phenyl]dodecafluorohexane,
1,7-bis[4-(3,4-dicarboxyphenoxy)phenyl]tetradecafluoroheptane,
1,5-bis[4-(3,4-dicarboxyphenoxy)-3,5-dibromophenyl]decafluoroheptane,
1,5-bis[4-(3,4-dicarboxyphenoxy)-3,5-bistrifluoromethylphenyl]decafluoropentane,
1,5-bis[4-(3,4-dicarboxy-2-trifluoromethylphenoxy)phenyl]decafluoropentane, etc.

These tetracarboxylic acid derivatives can be used alone or as a mixture thereof.

Among these tetracarboxylic acid derivatives, 2,2-bis[4-(3,4-dicarboxyphenoxy)phenyl]hexafluoropropane dianhydride (DCPFP), and 2,2-bis[4-(3,4-dicarboxybenzoyloxy)phenyl]hexafluoropropane dianhydride (DCBFP) are more preferable.

The above-mentioned tetracarboxylic acid derivatives can be prepared, for example, by reacting an N-substituted halogenated (or nitrated) phthalimide with a bisphenol derivative to conduct etherification, followed by hydrolysis of the two terminal imido groups to give a free carboxylic acid. Conversion of the free carboxylic acid to an acid anhydride, an ester or an acid halide can be carried out by a conventional method.

The polyimide having repeating units of the formula (II) can easily be obtained by imidization of the polyamide-acid having repeating units of the formula (I).

Another method for producing a polyimide having ester types of $Y_1$ and $Y_2$ in the formula (II) is to previously produce a both-terminal bisphenol compound from a trimellitic acid derivative with a diamine, and to conduct esterification reaction with the remaining acid derivative group with a bisphenol compound or a derivative thereof. For example, the desired polymer can be produced by reacting trimellitic anhydride with a diamine to give a bisimide, conducting esterification with a lower alcohol, followed by ester exchange reaction with hexafluorobisphenol A.

In the case of a polyetherimide wherein $Y_1$ and $Y_2$ are —O—, a diamine or isocyanate compound is reacted with a dicarboxylic acid derivative having one or more halogens or nitro groups to give an imide compound having halogens or nitro groups at the both ends, followed by condensation reaction with a corresponding bisphenol derivative to conduct etherification to give the desired polymer.

In this invention, there can also be co-used the following tetracarboxylic acids such as pyromellitic acid, 3,3',4,4'-biphenyl tetracarboxylic acid, 2,3,3',4'-biphenyl tetracarboxylic acid, 3,3',4,4'-diphenyl ether tetracarboxylic acid, 2,3,3',4'-diphenyl ether tetracarboxylic acid, 3,3',4,4'-benzophenone tetracarboxylic acid, 2,3,3',4'-benzophenone tetracarboxylic acid, 2,3,6,7-naphthalene tetracarboxylic acid, 1,4,5,8-naphthalene tetracarboxylic acid, 1,2,5,6-naphthalene tetracarboxylic acid, 3,3',4,4'-diphenylmethane tetracarboxylic acid, 2,2-bis(3,4-dicarboxyphenyl)propane, 2,2-bis(3,4-dicarboxyphenyl)hexafluoropropane, 3,3',4,4'-diphenylsulfone tetracarboxylic acid, 3,4,9,10-perylene tetracarboxylic acid, 2,2-bis[4-(3,4-dicarboxyphenoxy)phenyl]propane, or acid dianhydrides thereof, or partially esterified products with a lower alcohol.

When high heat resistance is not required, the co-use of aliphatic tetracarboxylic acids such as butanetetracarboxylic acid, cyclopentanetetracarboxylic acid, or the like is possible.

Examples of diamines are m-phenylenediamine, p-phenylenediamine, benzidine, 4,4''-diaminoterphenyl, 4,4'''-diaminoquaterphenyl, 4,4'-diaminodiphenyl ether, 4,4'-aminodiphenylmethane, 4,4'-diaminodiphenyl sulfone, 2,2-bis(p-aminophenyl)propane, 1,5-diaminonaphthalene, 2,6-diaminonaphthalene, 3,3'-dimethylbenzidine, 3,3'-dimethoxybenzidine, 3,3'-dimethyl-4,4'-diaminodiphenyl ether, 3,3'-dimethyl-4,4'-diaminodiphenylmethane, 1,4-bis(p-aminophenoxy)benzene, 4,4'-bis(p-aminophenoxy)biphenyl, 2,2-bis[4-(p-aminophenoxy)phenyl]propane, 2,2-bis(p-aminophenyl)hexafluoropropane, diamines represented by the formula:

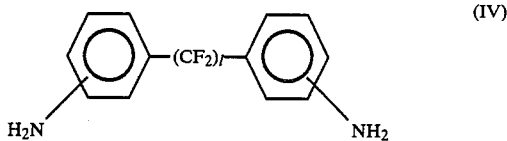 (IV)

wherein l is an integer of 1 to 6, such as 2,2-bis(aminophenyl)hexafluoropropane, etc., 2,3,5,6-tetramethyl-p-phenylenediamine, etc.

These diamines can be used alone or as a mixture thereof.

Among these diamines, those having one or more $CF_3$ groups, particularly 2,2-bis[4-(4-aminophenoxy)phenyl]hexafluoropropane (DAPFP) and 2,2-bis[4-(3-trifluoromethyl-4-aminophenoxy)phenyl]hexafluoropropane (DAFPFP) are more preferable.

In order to improve adhesiveness with glass, ceramics, metals, it is possible to use silicon-containing diamines represented by the formulae:

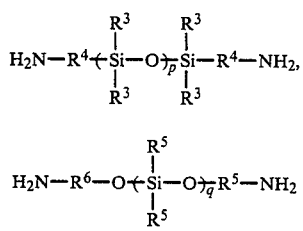

wherein
$R^4$ and $R^6$ are independently a divalent organic group such as ethylene, propylene, phenylene, etc.;

$R^3$ and $R^5$ are independently a monovalent organic group such as methyl, ethyl, propyl, phenyl, etc.; p and q are integers larger than 1, or fluorine-containing aromatic diamines such as 2,2-bis[4-(4-aminophenoxy)phenyl]hexafluoropropane,
2,2-bis[4-(3-aminophenoxy)phenyl]hexafluoropropane,
2,2-bis[4-(2-aminophenoxy)phenyl]hexafluoropropane,
2,2-bis[4-(2-aminophenoxy)-3,5-dimethylphenyl]hexafluoropropane,
p-bis(4-amino-2-trifluoromethylphenoxy)benzene,
4,4'-bis(4-amino-2-trifluoromethylphenoxy)biphenyl,
4,4'-bis(4-amino-3-trifluoromethylphenoxy)biphenyl,
4,4'-bis(4-amino-2-trifluoromethylphenoxy)diphenyl sulfone,
4,4'-bis(3-amino-5-trifluoromethylphenoxy)diphenyl sulfone,
2,2-bis[4-(4-amino-2-trifluoromethylphenoxy)phenyl]hexafluoropropane, etc.

The polyamide-acid of the formula (I) of this invention can be obtained by polymerization of one or more aromatic aminodicarboxylic acid derivatives or reactions of one or more aromatic diamines or aromatic diisocyanates with one or more aromatic tetracarboxylic acid derivatives, the latter being used in 0.9 to 1.1 moles per mole of the former, preferably 1:1 molar ratio. As the tetracarboxylic acid derivatives, there can be used esters, acid anhydrides, acid chlorides, and the like. The use of acid anhydrides is more preferable from the viewpoint of production. The synthesis reactions can usually be carried out in a solvent such as N-methyl-2-pyrrolidone (NMP), dimethylformamide (DMF), dimethylacetamide (DMAC), dimethyl sulfoxide (DMSO), dimethyl sulfate, sulfolane, butyrolacetone, cresol, phenol, a halogenated phenol, cyclohexanone, dioxane, or a mixture thereof at a temperature of 0° to 200° C. In such a case, a polyimide may partially formed in the reaction solution.

The polyimide of the formula (II) of this invention can be produced by a conventional method from the corresponding polyamide-acid of the formula (I).

This invention is illustrated by way of the following Examples.

Abbreviations of compounds used in the Examples are as follows:
BPDA: biphenyl-3,3',4,4'-tetracarboxylic dianhydride
BTDA: benzophenone-3,3',4,4'-tetracarboxylic dianhydride
BTPF5: 1,5-bis[4-(3,4-dicarboxybenzoyloxy)phenyl]decafluoropentane
DAFPFP: 2,2-bis[4-(3-trifluoromethyl-4-aminophenoxy)lphenyl]hexafluoropropane
DAPP: 2,2-bis[4-(4-aminophenoxy)phenyl]propane
DAPFP: 2,2-bis[4-(4-aminophenoxy)phenyl]hexafluoropropane
DCBFP: 2,2-bis[4-(3,4-dicarboxybenzoyloxy)phenyl]hexafluoropropane dianhydride
DCFBFP: 2,2-bis[4-(5-trifluoromethyl-3,4-dicarboxybenzoyloxy)phenyl]hexafluoropropane
DCPFP: 2,2-bis[4-(3,4-dicarboxyphenoxy)phenyl]hexafluoropropane dianhydride
DDE: 4,4'-diaminodiphenyl ether
DFAPFP: 2,2-bis[4-(2-trifluoromethyl-4-aminophenoxy)phenyl]hexafluoropropane
NMP: N-methyl-2-pyrrolidone
PDA: p-phenylenediamine
PMDA: pyromellitic dianhydride

EXAMPLE 1

In a four-necked flask equipped with a stirrer, a reflux condenser, a thermometer and a nitrogen introducing tube, 2.05 g of PDA was dissolved in 85 g of NMP. Then, the flask was dipped in a water bath at 20° C. and 12.95 g of DCBFP was added gradually while controlling exothermic heat. After dissolving DCBFP, the water bath was taken off and the reaction was continued at about room temperature for about 5 hours. The viscosity of varnish became 250 poises at 25° C.

The resulting polyamide-acid had repeating units of the formula:

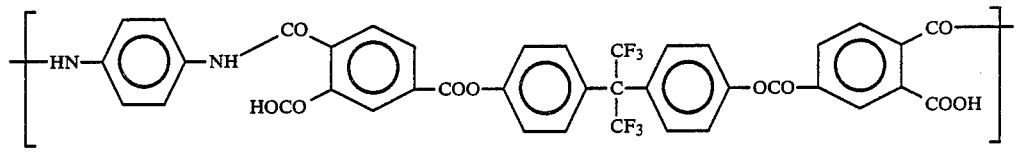

(the viscosity of varnish having 15% solid content: 330 poises at 25° C.).

The varnish was coated on a glass plate and imidized in nitrogen at 150° C. for 1 hour, at 250° C. for 0.5 hour, and at 400° C. for 1 hour to give a polyimide film having repeating units of the formula:

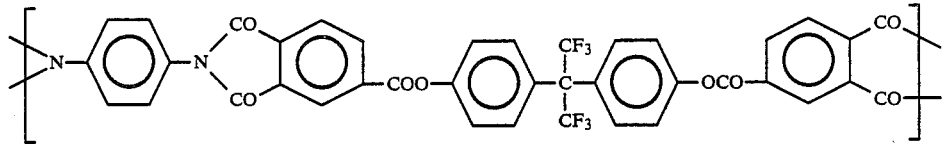

The film was tough (not brittle) and showed the saturated moisture absorption of 0.75% (25° C., 75% RH).

Then, a pyrolysis temperature was measured by using a precision thermobalance. A sample was rapidly heated to 350° C. at 200° C./min under a nitrogen atmosphere, dried at that temperature for 15 minutes, heated at 200° C./min to a predetermined temperature, and measured a weight loss with the lapse of time at a constant temperature. At least three weight loss curves having different pyrolysis temperatures were obtained and a temperature necessary for 100 minutes for 3% weight loss was obtained by Arrhenius plots. This temperature was defined as pyrolysis temperature. The time necessary for 3% weight loss of film was 9 minutes at 500° C. in nitrogen, 21 minutes at 490° C., 46 minutes at 475° C. and 200 minutes at 450° C. Therefore, the pyrolysis temperature in nitrogen was 470° C. In the case of under air, the time was 20 minutes at 475° C., 85 minutes at 450° C., 120 minutes at 440° C. and 220 minutes at 425° C. Therefore, the pyrolysis temperature in air was 450° C.

As mentioned above, the polyimide thus obtained was excellent both in low moisture absorption properties and heat resistance.

COMPARATIVE EXAMPLE 1

A polyamide-acid was synthesized in NMP by using PDA and PMDA in amounts described below in the same manner as described in Example 1:
PDA: 14.92 g
PMDA: 30.08 g
NMP: 255 g Then, a polyimide film was produced to measure the saturated moisture absorption (25° C., 75% RH) and the pyrolysis temperature. The imidization conditions were 150° C./1 hour+300° C./0.5 hour+450° C./0.3 hour under a nitrogen atmosphere.

The saturated moisture absorption was 4.8% and the pyrolysis temperature was 470° C. in air and 510° C. in nitrogen. This film was excellent in the pyrolysis temperature but poor in moisture absorption and brittle in mechanical strength.

COMPARATIVE EXAMPLE 2

A polyamide-acid was synthesized in NMP by using DDE and BTDA in amounts described below in the same manner as described in Example 1:
DDE: 21.52 g
BTDA: 23.46 g
NMP: 255 g Then, a polyimide film was produced to measure the saturated moisture absorption (25° C., 75% RH) and the pyrolysis temperature. The imidization conditions were 100° C./1 hour+300° C./0.5 hour+400° C./0.5 hour under a nitrogen atmosphere.

As a result, the saturated moisture absorption was 2.5% and the pyrolysis temperature was 440° C. in air and 475° C. in nitrogen.

COMPARATIVE EXAMPLE 3

A polyamide-acid was synthesized in NMP by using DAPP and PMDA in amounts described below in the same manner as described in Example 1:
DAPP: 29.39 g
PMDA: 15.61 g
NMP: 255 g Then, a polyimide film was produced to measure the saturated moisture absorption (25° C., 75% RH) and the pyrolysis temperature. The imidization conditions were 100° C./1 hour+350° C./0.5 hour under a nitrogen atmosphere.

As a result, the saturated moisture absorption was 0.8% and the pyrolysis temperature was 400° C. in air and 430° C. in nitrogen. By introducing the segments such as DAPP, the low moisture absorption can be attained to a considerable extent but the pyrolysis temperature became lower.

EXAMPLE 2

A polyamide-acid varnish was synthesized in the same manner as described in Example 1 using the following formulation:
DDE: 3.40 g
DCBFP: 11.60 g
NMP: 85 g The resulting polyamide-acid had repeating units of the formula:

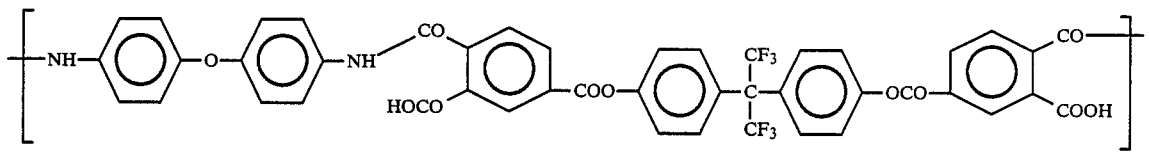

(the viscosity of varnish: 50 poises at 25° C.).

From this varnish, there was obtained in the same manner as described in Example 1 a tough polyimide film having repeating units of the formula:

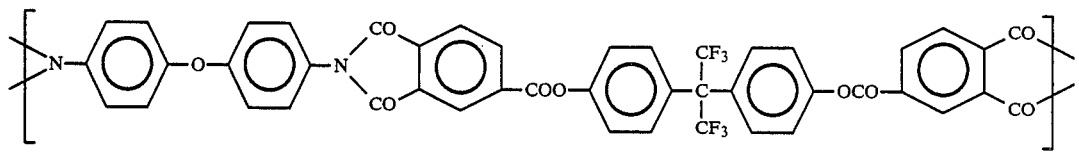

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.65% (25° C., 75% RH) and the pyrolysis temperature was 435° C. in air and 455° C. in nitrogen.

EXAMPLE 3

A polyamide-acid varnish was synthesized in the same manner as described in Example 1 using the following formulation:
DAPFP: 6.46 g
DCBFP: 8.54 g
NMP: 85 g The resulting polyamide-acid had repeating units of the formula:

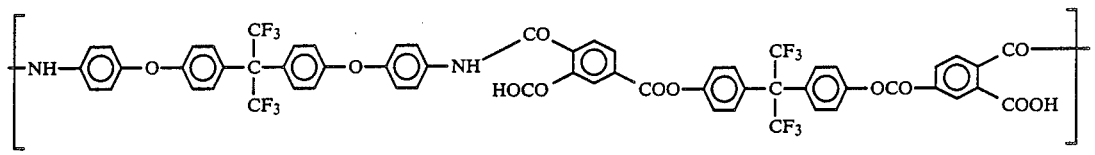

(the viscosity of varnish: 13 poises at 25° C.).

From this varnish, there was obtained in the same manner as described in Example 1 a tough polyimide film having repeating units of the formula:

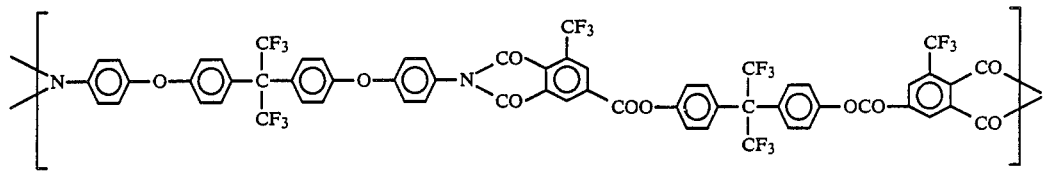

The polyimide film was subjected to measurement of the saturated moisture absorption and the pyrolysis temperature. The imidization conditions were 150° C./1 hour+350° C./0.5 hour under a nitrogen atmosphere.

As a result, the saturated moisture absorption was 0.45% (25° C., 75% RH) and the pyrolysis temperature was 430° C. in air and 450° C. in nitrogen.

EXAMPLE 4

A polyamide-acid varnish was synthesized in the same manner as described in Example 1 using the following formulation:
DAPFP: 5.81 g
DCFBFP: 9.19 g
NMP: 85 g
The resulting polyamide-acid had repeating units of the formula:

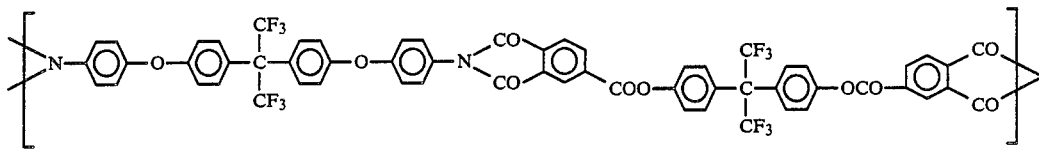

(the viscosity of varnish: 13 poises at 25° C.).

From this varnish, there was obtained in the same manner as described in Example 1 a polyimide film having repeating units of the formula:

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.4% (25° C., 75% RH) and the pyorlysis temperature was 430° C. in air and 440° C. in nitrogen.

EXAMPLE 5

A polyamide-acid varnish was synthesized in the same manner as described in Example 1 using the following formulation:
DAPFP: 5.97 g
BTPF5: 9.03 g
NMP: 85 g
The resulting polyamide-acid had repeating units of the formula:

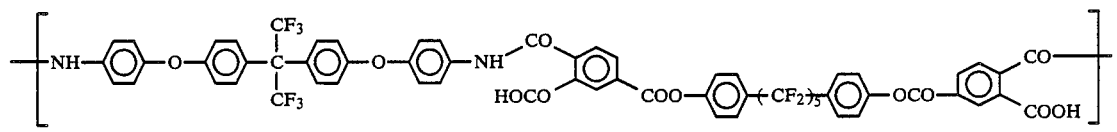

(the viscosity of varnish: 15 poises at 25° C.).

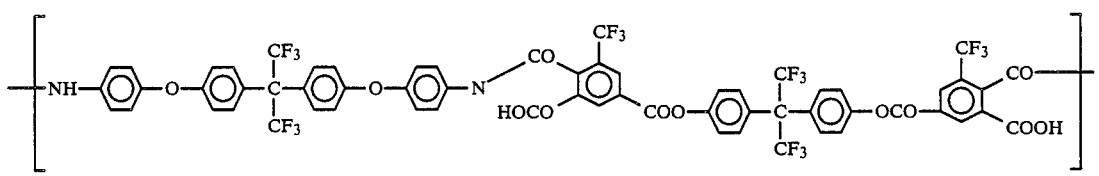

From this varnish, there was obtained in the same manner as described in Example 1 a polyimide film having repeating units of the formula:

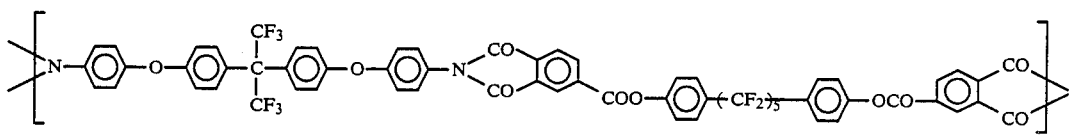

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.4% (25° C., 75% RH) and the pyrolysis temperature was 420° C. in air and 430° C. in nitrogen.

EXAMPLE 6

A polyamide-acid varnish was synthesized in the same manner as described in Example 1 using the following formulation:
DAFPFP: 7.33 g
DCBFP: 7.67 g
NMP: 85 g
The resulting polyamide-acid had repeating units of the formula:

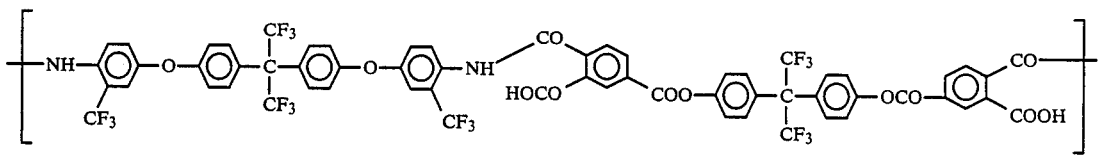

(the viscosity of varnish: 1.5 poises at 25° C.).

From this varnish, there was obtained in the same manner as described in Example 1 a polyimide film (slightly brittle) having repeating units of the formula:

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.4% (25° C., 75% RH) and the pyrolysis temperature was 430° C. in air and 440° C. in nitrogen.

EXAMPLE 7

A polyamide-acid varnish was synthesized in the same manner as described in Example 1 using the following formulation:
DAFPFP: 8.02 g
BPDA: 1.08 g
DCBFP: 5.88 g
NMP: 85 g
The resulting polyamide-acid had repeating units of the formula:

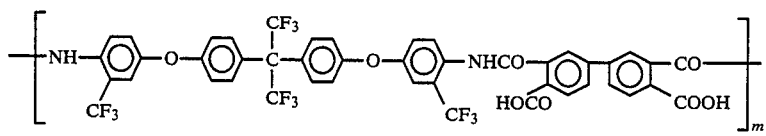

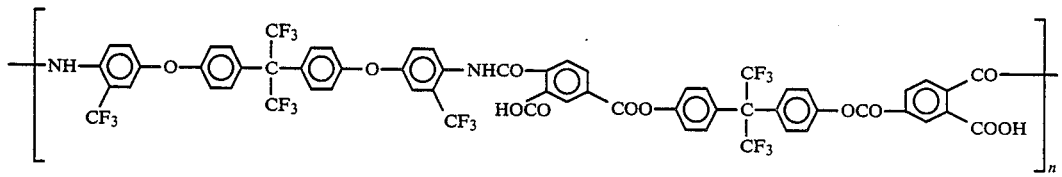

wherein m and n are positive integers and m:n=3:7 in molar ratio (the viscosity of varish: 5 poises at 25° C.).

From this varnish, there was obtained in the same manner as described in Example 1 a tough polyimide film having repeating units of the formula:

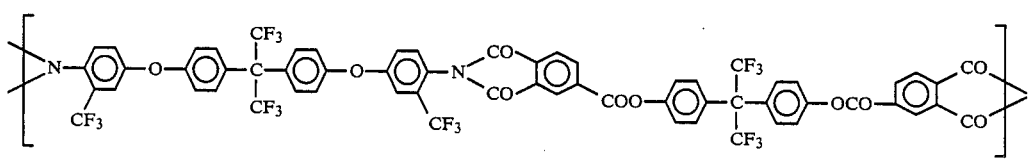

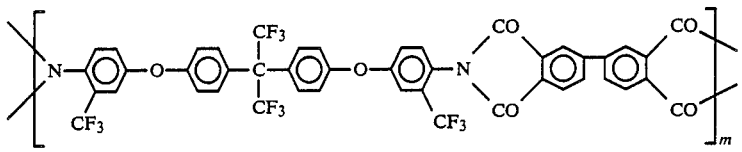

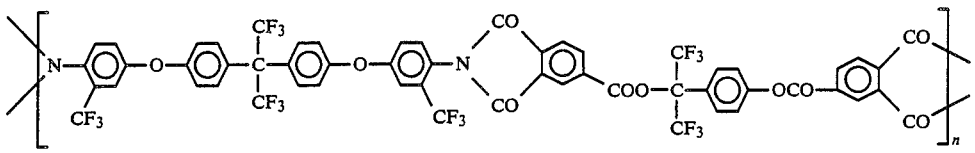

(m:n=3:7 in molar ratio)

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.4% (25° C., 75% RH) and the pyrolysis temperature was 430° C. in air and 440° C. in nitrogen.

EXAMPLE 8

A polyamide-acid varnish was synthesized in the same manner as described in Example 1 using the following formulation:
DAFPFP: 8.58 g
BPDA: 1.93 g
DCBFP: 4.49 g
NMP: 85 g The resulting polyamide-acid had the same repeating units as in Example 7 but m:n=5:5 (the viscosity of varnish: 4.5 poises at 25° C.).

From this varnish, there was obtained in the same manner as described in Example 1 a tough polyimide film having the same repeating units as in Example 7 but m:n=5:5.

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.45% (25° C., 75% RH) and the pyrolysis temperature was 440° C. in air and 450° C. in nitrogen.

EXAMPLE 9

A polyamide-acid varnish was synthesized in the same manner as described in Example 1 using the following formulation:
DDE: 3.63 g
DCPFP: 11.38 g
NMP: 85 g The resulting polyamide-acid had repeating units of the formula:

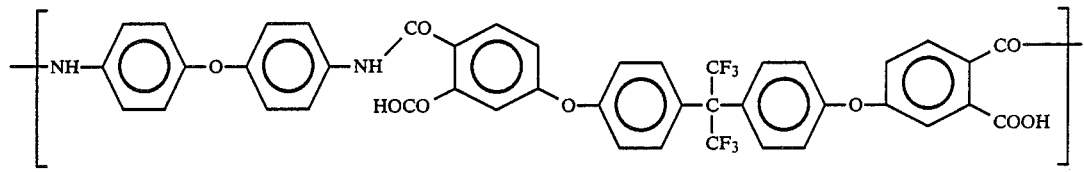

(the viscosity of varnish: more than 2000 poises at 25° C.).

From this varnish, there was obtained in the same manner as described in Example a tough polyimide film having repeating units of the formula:

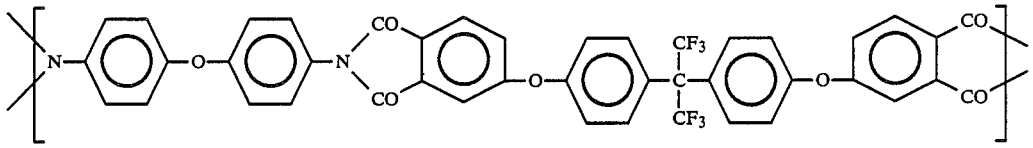

The polyimide film was subject to measurement of the saturated moisture absorption and the pyrolysis temperature. The imidization conditions were 150° C./1 hour+350° C./0.5 hour under a nitrogen atmosphere.

As a result, the saturated moisture absorption was 0.65% (25° C., 75% RH) and the pyrolysis temperature was 440° C. in air and 460° C. in nitrogen.

EXAMPLE 10

A polyamide-acid varnish was synthesized in the same manner as described in Example 1 using the following formulation:
DAPFP: 6.78 g
DCPFP: 8.22 g
NMP: 85 g The resulting polyamide-acid had repeating units of the formula:

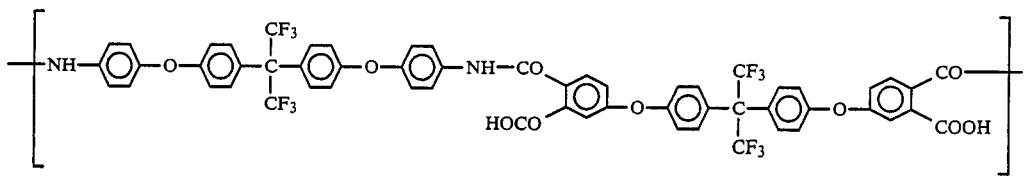

(the viscosity of varnish: 22 poises at 25° C.).

From this varnish, there was obtained in the same manner as described in Example 1 a tough almost transparent polyimide film having repeating units of the formula:

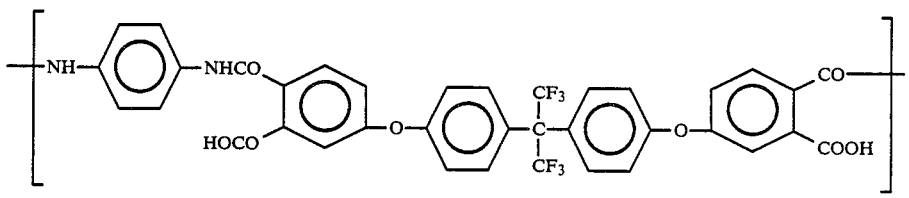

The polyimide film was subject to measurement of the saturated moisture absorption and the pyrolysis temperature. The imidization conditions were 150° C./1 hour+350° C./0.5 hour under a nitrogen atmosphere.

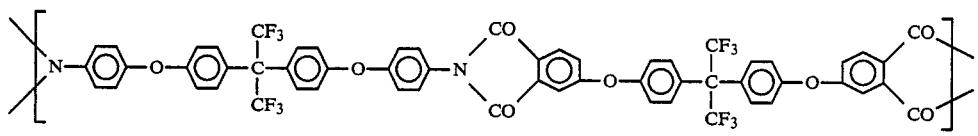

As a result, the saturated moisture absorption was 0.4% (25° C., 75% RH) and the pyrolysis temperature was 430° C. in air and 450° C. in nitrogen.

Compared with Comparative Examples 1 and 2, the heat resistance is almost not changed but the moisture absorption is lowered to 1/6 to 1/10 of those of Comparative Examples 1 and 2.

EXAMPLE 11

A polyamide-acid varnish was synthesized in the same manner as described in Example 9 using the following formulation:
PDA: 2.20 g
DCPFP: 12.80 g
NMP: 85 g
Since the viscosity was increased extremely during the synthesis of the polyamide-acid varnish, stirring with heating at 85° C. for 4 hours was conducted to lower the viscosity to 50 poises.

The resulting polyamide-acid had repeating units of the formula:

(the viscosiy of varnish: more than 2000 poises at 25° C.).

From this varnish, there was obtained in the same manner as described in Example 1 a tough polyimide film having repeating units of the formula:

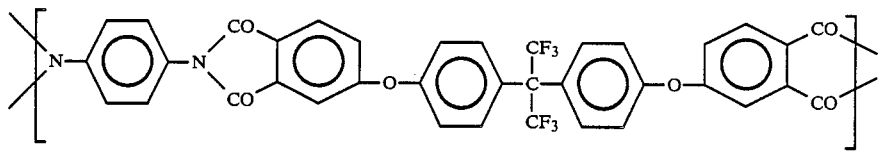

The polyimide film was subject to measurement of the saturated moisture absorption and the pyrolysis temperature. The imidization conditions were 150° C./1 hour+400° C./0.5 hour under a nitrogen atmosphere.

As a result, the saturated moisture adsorption was 0.7% (25° C., 75% RH) and the pyrolysis temperature was 445° C. in air and 465° C. in nitrogen.

EXAMPLE 12

A polyamide-acid varnish was synthesized in the same manner as described in Example 9 using the following formulation:
DAPFP 6.06 g
2,2-bis[4-(3,4-dicarboxy-2-trifluoromethylphenoxy)-phenyl]hexafluoropropane 8.94 g
NMP 85 g
The resulting polyamide-acid had repeating units of the formula:

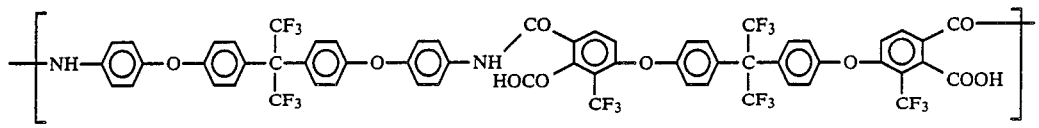

(the viscosity of varnish: 13 poises at 25° C.).

From this varnish, there was obtained in the same manner as described in Example 1 a polyimide film having repeating units of the formula:

As a result, the saturated moisture absorption was 0.55% (25° C., 75% RH) and the pyrolysis temperature was 440° C. in air and 460° C. in nitrogen.

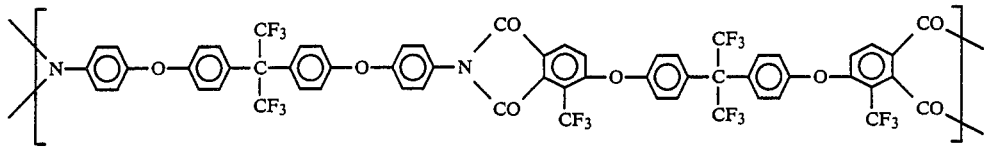

The polyimide film was subject to measurement of the saturated moisture absorption and the pyrolysis temperature. The imidization conditions were 150° C./1 hour +350° C./0.5 hour under a nitrogen atmosphere.

As a result, the saturated moisture absorption was 0.33% (25° C., 75% RH) and the pyrolysis temperature was 430° C. in air and 440° C. in nitrogen.

EXAMPLE 13

A polyamide-acid was synthesized in the same manner as described in Example 9 using the following formulation:
DDE 3.23 g
1,5-bis[4-(3,4-dicarboxyphenoxy)phenyl]decafluoropentane 11.77 g p1 NMP 85 g
The resulting polyamide-acid had repeating units of the formula:

EXAMPLE 14

The polyamide-acid varnish obtained in Example 13 was added with 15 g of toluene, heated at 140° C. for 1 hour with stirring, cooled to 100° C. and removed water under a reduced pressure produced by toluene and imide ring closure (viscosity: 2100 poises at 25° C.).

A polyimide film was produced by using the varnish and heating at 150° C. for 1 hour, at 130° C. for 2 hours followed by drying at 130° C. for 2 hours under 0.5 mm Hg or lower.

The resulting film was confirmed by infrared absorption imide ring closure in almost all portions. The resulting polyimide was also excellent in solubility. But when heated at 300° C. for 0.5 hour, the resulting product was not dissolved in NMP.

EXAMPLE 15

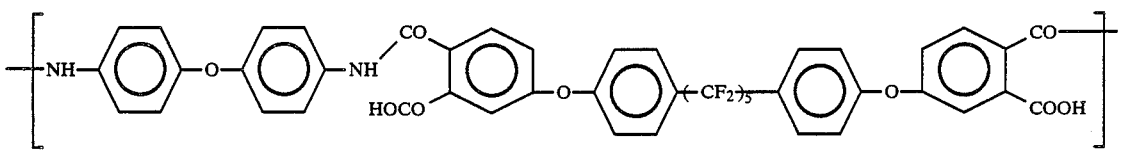

(the viscosity of varnish: 180 poises at 25° C.).

From this varnish, there was obtained in the same manner as described in Example 1 a polyimide film having repeating units of the formula:

A polyamide-acid varnish was synthesized in the same manner as described in Example 9 using the following formulation:
DFAPFP: 7.65 g

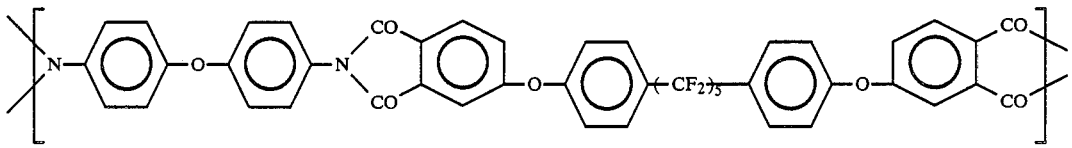

The polyimide film was subject to measurement of the saturated moisture absorption and the pyrolysis temperature. The imidization conditions were 150° C./1 hour +350° C./0.5 hour under a nitrogen atmosphere.

DCPFP: 7.35 g
NMP: 85 g
The resulting polyamide-acid had repeating units of the formula:

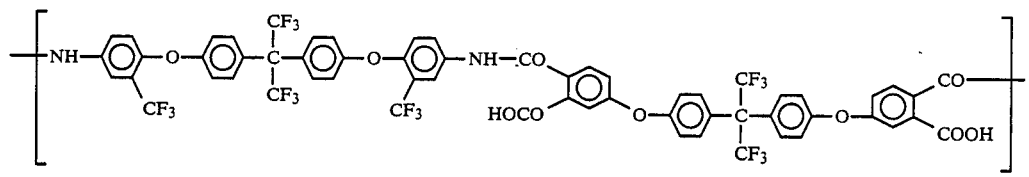

(the viscosity of varnish: 11 poises at 25° C.).

A polyimide film was produced under imidization conditions of 150° C./1 hour+350° C./0.5 hour under a nitrogen atmosphere.

The resulting tough, colorless and transparent polyimide film had repeating units of the formula:

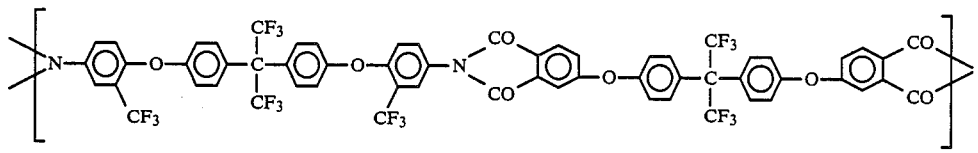

The resulting film had the saturated moisture absorption of 0.35% (25° C., 75% RH) and the pyrolysis temperature of 430° C. in air and 440° C. in nitrogen.

EXAMPLE 16

A polyamide-acid varnish was synthesized in the same manner as described in Example 9 using the following formulation:
DAPFP: 7.43 g
BPDA: 1.27 g
DCPFP: 6.30 g
NMP: 85 g
The resulting polyamide-acid had repeating units of the formula:

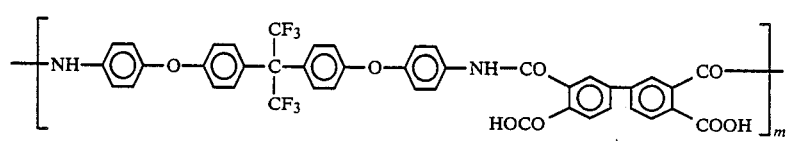

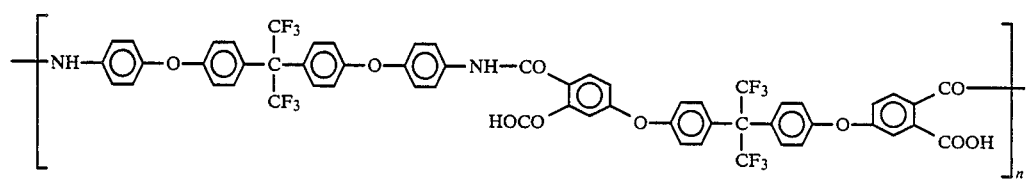

wherein m and n are positive integers and m:n=3:7 in molar ratio (the viscosity of varnish: 35 poises at 25° C.).

A polyimide film was produced under imidization conditions of 150° C./1 hour+350° C./0.5 hours under a nitrogen atmosphere.

The resulting polyimide film had repeating units of the formula:

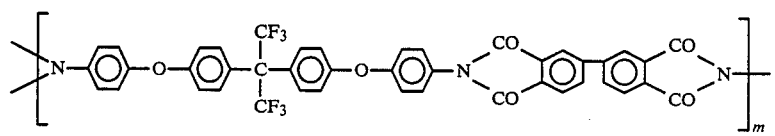

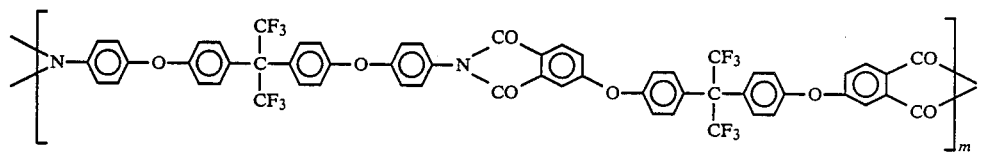

(m:n=3:7 in molar ratio).

The resulting film had the saturated moisture absorption of 0.5% (25° C., 75% RH) and the pyrolysis temperature of 430° C. in air and 450° C. in nitrogen.

EXAMPLE 17

A polyamide-acid varnish was synthesized in the same manner as described in Example 9 using the following formulation:
DAPFP: 7.94 g
BPDA: 2.25 g
DCPFP: 4.81 g
NMP: 85 g The resulting polyamide-acid had the same repeating units as in Example 16 but m:n=5:5 (the viscosity of varnish: 115 poises at 25° C.).

A polyimide film was produced under imidization conditions of 150° C./1 hour+350° C./0.5 hour under a nitrogen atmosphere. The resulting polyimide film had the same repeating units as in Example 16 but m:n=5:5.

The polyimide film had the saturated moisture absorption of 0.55% (25° C., 75% RH) and the pyrolysis temperature of 440° C. in air and 460° C. in nitrogen.

EXAMPLE 18

A polyamide-acid varnish was synthesized in the same manner as described in Example 9 using the following formulation:
DAPP: 56.23 g
2,2-bis[4-(3,4-dicarboxyphenoxy)-3,5-dimethylphenyl]hexafluoropropane dianhydride 93.77 g
NMP 850 g
The resulting polyamide-acid had repeating units of the formula:

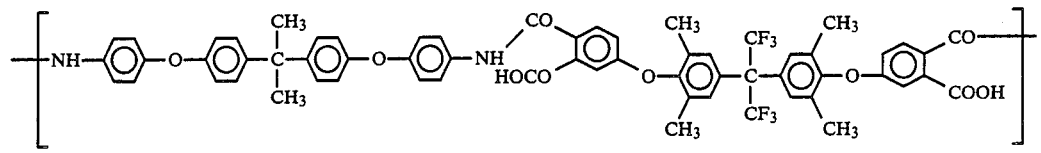

(the viscosity of varnish: more than 2000 poises at 25° C.).

A polyimide film was produced under imidization conditions of 150° C./1 hour+250° C./0.5 hour under a nitrogen atmosphere.

The resulting polyimide film had repeating units of the formula:

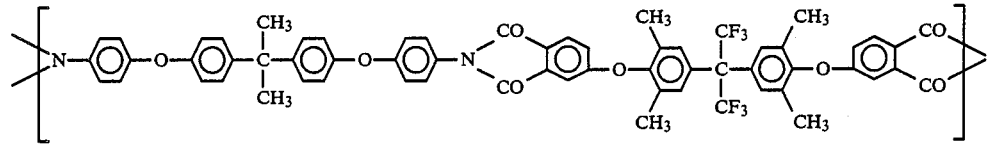

The polyimide film had the saturated moisture absorption of 0.43% (25° C., 75% RH). The glass transition temperature was 240° C. and a weight loss heated at 420° C. for 1 hour in nitrogen was 3.5%.

EXAMPLE 19

A polyamide-acid varnish was synthesized in the same manner as described in Example 9 using the following formulation:
DDE: 16.24 g
DAPP: 33.30 g
BPDA: 23.87 g
2,2-bis[4-(3,4-carboxyphenoxy)-3,5-dibromophenyl]-hexafluoropropane dianhydride 76.58 g
NMP: 850 g
The resulting polyamide-acid had repeating units of the formula:

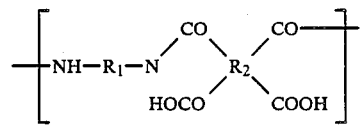

wherein $R_1$ is

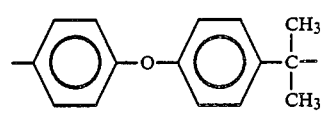 plus

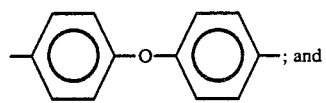

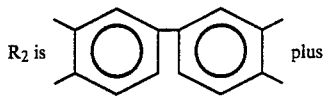; and $R_2$ is 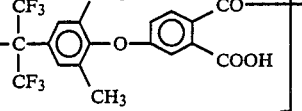 plus

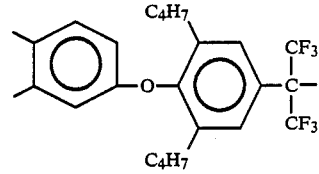

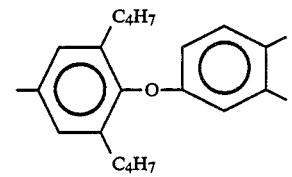

(the viscosity of varnish: 230 poises at 25° C.)

A polyimide film was produced under imidization conditions of 100° C./1 hour+250° C./0.5 hour under a nitrogen atmosphere. The resulting polyimide had repeating units of the formula:

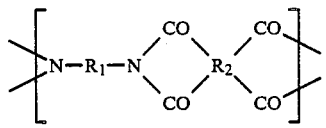

where $R_1$ and $R_2$ are as defined above.

The resulting polyimide film had the glass transition temperature of 250° C. and the saturated moisture absorption of 0.9% (25° C., 75% RH).

COMPARATIVE EXAMPLE 4

A polyamide-acid varnish was synthesized in the same manner as described in Example 9 using the following formulation:
DDE: 36.3 g
2,2-bis[4-(3,4-dicarboxyphenoxy)phenyl]propane dianhydride 11.38 g
NMP: 85 g A polyimide film was produced under imidization conditions of 150° C./1 hour + 250° C./0.5 hour under a nitrogen atmosphere.

The resulting polyimide film had the saturated moisture absorption of 0.8% (25° C., 75% RH) and the pyrolysis temperature of 390° C. in air and 420° C. in nitrogen.

Comparing with the polyimide of Example 9, the pyrolysis temperature was lowered about 50° C. when only the perfluoropropylene group ($R_f$ in the formula (II) is changed to a non-substituted propylene group.

EXAMPLE 20

In a four-necked flask equipped with a stirrer, a reflux condenser, a thermometer and a nitrogen introducing tube, a mixture obtained by adding 11.38 g of DCPFP and 1.7 g of ethanol to 25.1 g of NMP was placed and reacted under reflux for about 2 hours. After cooled, 3.63 g of DDE was charged in the flask to carry out the reaction at room temperature for 2 hours, and further at 100° C. for 1 hour to give a partially esterified polyamide-acid varnish.

The resulting polyamide-acid had repeating units of the formula:

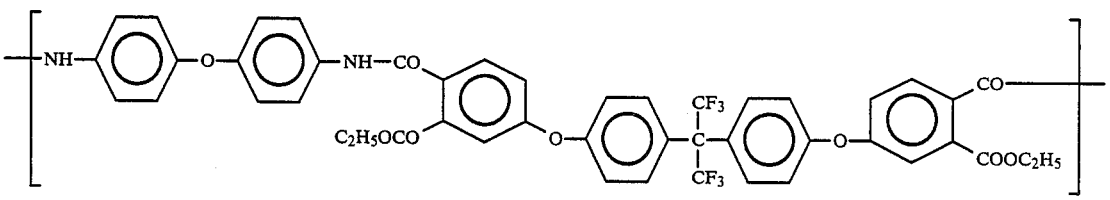

(the viscosity of varnish: 15 poises at 25° C.).

The varnish was coated on a glass plate and dried and cured with gradual heating at 2° C./min from room temperature to 300° C. to give a polyimide film having repeating units of the formula:

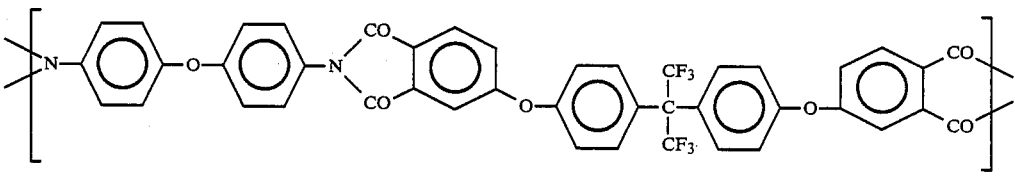

The resulting film had almost the same physical properties as Example 9.

What is claimed is:

1. A polyamide-acid derivative having repeating units of the formula:

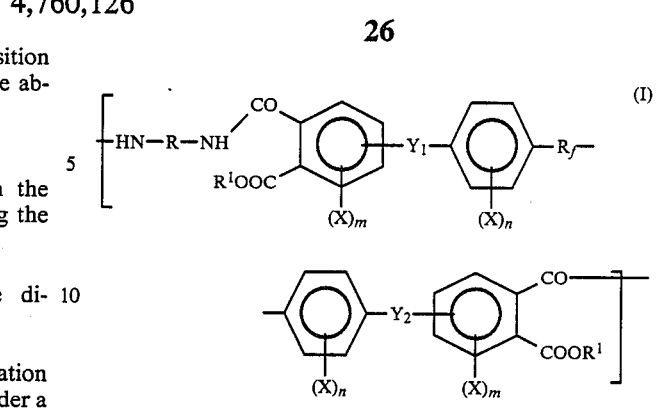

wherein $Y_1$ and $Y_2$ are independently a divalent group of

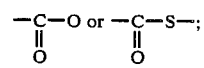

$R_f$ is a perfluoroalkylene group; each X is independently an alkyl group, a fluorinated alkyl group or a halogen atom; $R^1$ is a hydrogen atom or an alkyl group; R is a diamine residue obtained by removing two amino groups from a diamine; m is zero or an integer of 1 to 3; and n is zero or an integer of 1 to 4.

2. A polyamide-acid derivative according to claim 1, wherein $Y_1$ and $Y_2$ in the formula (I) are

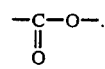

3. A polyamide-acid derivative according to claim 1, which is produced by reacting a diamine with a tetracarboxylic acid derivative.

4. A polyamide-acid derivative according to claim 1, wherein the $R_f$ in the formula (I) is

and at least one X is $CF_3$.

5. A polyamide-acid derivative according to claim 3, wherein the diamine is 2,2-bis[4-(4-aminophenoxy)- phenyl]hexafluoropropane, 2,2-bis[4-(3-trifluoromethyl-4-amino-phenoxy)phenyl]hexafluoropropane or a mixture of at least one of the diamines and another aromatic diamine.

6. A polyamide-acid derivative according to claim 3, wherein the tetracarboxylic acid derivative is 2,2-bis[4-(3-,4-dicarboxybenzoyloxy)phenyl]hexafluoropropane dianhydride, or a mixture of the tetracarboxylic acid derivative and another aromatic tetracarboxylic acid derivative.

7. A polyamide-acid derivative according to claim 3, wherein the diamine is p-phenylenediamine or 4,4'-diaminodiphenyl ether and the tetracarboxylic acid derivative is 2,2-bis[4-(3,4-dicarboxybenzoyloxy)-phenyl]hexafluoropropane dianhydride.

8. A polyamide-acid derivative according to claim 3, wherein the diamine is 2,2-bis[4-(4-aminophenoxy)-phenyl]hexafluoropropane or 2,2-bis[4-(3-trifluoromethyl-4-aminophenoxy)phenyl]hexafluoropropane and the tetracarboxylic acid derivative is 2,2-bis[4-(3-dicarboxybenzoyloxy)-phenyl]hexafluoropropane dianhydride.

9. A polyimide having repeating units of the formula:

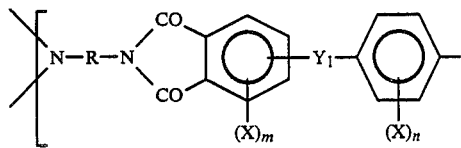
(II)

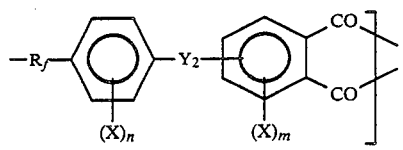

wherein $Y_1$ and $Y_2$ are independently a divalent group of

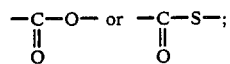

$R_f$ is a perfluoroalkylene group; each X is independently an alkyl group, a fluorinated alkyl group or a halogen atom; R is a diamine residue obtained by removing two amino groups from a diamine; m is zero or an integer of 1 to 3; and n is zero or an integer of 1 to 4.

10. A polyimide according to claim 9, which further includes pyrrolone rings or isoindoloquinazolinedione rings or pyrrolone rings and isoindoloquinazolinedione rings.

11. A polyimide according to claim 9, wherein $Y_1$ and $Y_2$ in the formula (II) are

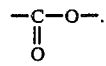

12. A polyimide obtained from the polyamide-acid derivative of claim 4.

13. A polyimide obtained from the polyamide-acid derivative of claim 5.

14. A polyimide obtained from the polyamide-acid derivative of claim 6.

15. A polyimide obtained from the polyamide-acid derivative of claim 7.

16. A polyimide obtained from the polyamide-acid derivative of claim 8.

* * * * *